(12) United States Patent
Hoehmann

(10) Patent No.: US 9,651,220 B2
(45) Date of Patent: May 16, 2017

(54) LIGHT MODULE FOR GENERATING WAVELENGTH-CONVERTED LIGHT

(71) Applicant: OSRAm GmbH, Munich (DE)

(72) Inventor: Peter Hoehmann, Berlin (DE)

(73) Assignee: Osram GmbH, Munich (DE)

( * ) Notice: Subject to any disclaimer, the term of this patent is extended or adjusted under 35 U.S.C. 154(b) by 252 days.

(21) Appl. No.: 14/516,706

(22) Filed: Oct. 17, 2014

(65) Prior Publication Data

US 2015/0124429 A1 May 7, 2015

(30) Foreign Application Priority Data

Nov. 5, 2013 (DE) .................. 10 2013 222 431

(51) Int. Cl.
| | |
|---|---|
| *F21V 9/10* | (2006.01) |
| *F21V 13/08* | (2006.01) |
| *F21V 17/02* | (2006.01) |
| *G03B 21/20* | (2006.01) |
| *G03B 33/08* | (2006.01) |
| *G02B 26/00* | (2006.01) |

(52) U.S. Cl.
CPC ............ *F21V 9/10* (2013.01); *F21V 13/08* (2013.01); *F21V 17/02* (2013.01); *G02B 26/008* (2013.01); *G03B 21/204* (2013.01); *G03B 33/08* (2013.01)

(58) Field of Classification Search
CPC .......... F21S 10/007; F21V 13/08; F21V 9/10; F21V 9/16; F21V 17/02; G02B 26/008; G02B 26/02; G02B 26/06; G03B 21/204; G03B 33/08

USPC ........................................................... 362/84
See application file for complete search history.

(56) References Cited

U.S. PATENT DOCUMENTS

| | | | | |
|---|---|---|---|---|
| 5,838,860 | A * | 11/1998 | Kingstone | F21V 29/74 385/100 |
| 2003/0067588 | A1* | 4/2003 | Belliveau | F21S 10/00 353/31 |
| 2012/0201030 | A1* | 8/2012 | Yuan | G02B 26/008 362/293 |
| 2012/0242912 | A1* | 9/2012 | Kitano | H04N 9/3111 348/759 |
| 2013/0088471 | A1* | 4/2013 | Kitano | H04N 9/3114 345/208 |
| 2013/0235352 | A1* | 9/2013 | Hsu | G03B 21/14 353/31 |

(Continued)

FOREIGN PATENT DOCUMENTS

DE 102011004574 A1 8/2012

*Primary Examiner* — Andrew Coughlin
*Assistant Examiner* — Colin Cattanach
(74) *Attorney, Agent, or Firm* — Viering, Jentschura & Partner mbB

(57) ABSTRACT

Various embodiments relate to a light module having an excitation radiation source, a rotatable color wheel having a plurality of sectors which can be irradiated sequentially by the excitation radiation source upon a rotation of the color wheel. In this case, a wavelength conversion element is arranged in a first region at least in one of the sectors. Furthermore, at least one subregion of a second region of the color wheel is embodied as at least partly light-transmissive, and at least one part of the light emitted by the at least one wavelength conversion element can be guided through said subregion to an output of the light module.

20 Claims, 7 Drawing Sheets

(56) References Cited

U.S. PATENT DOCUMENTS

| | | | |
|---|---|---|---|
| 2013/0250546 A1* | 9/2013 | Hu | F21V 9/08 |
| | | | 362/84 |
| 2013/0258639 A1* | 10/2013 | Hu | F21V 9/08 |
| | | | 362/84 |
| 2013/0271954 A1* | 10/2013 | Li | H04N 9/3114 |
| | | | 362/84 |
| 2013/0329426 A1 | 12/2013 | Finsterbusch et al. | |
| 2014/0204558 A1* | 7/2014 | Bartlett | G02B 26/008 |
| | | | 362/84 |

* cited by examiner

LIGHT MODULE FOR GENERATING WAVELENGTH-CONVERTED LIGHT

CROSS-REFERENCE TO RELATED APPLICATION

This application claims priority to German Patent Application Serial No. 10 2013 222 431.1, which was filed Nov. 5, 2013, and is incorporated herein by reference in its entirety.

TECHNICAL FIELD

Various embodiments relate generally to a light module for generating wavelength-converted light.

BACKGROUND

In light modules, e.g. LARP (Laser Activated Remote Phosphor) applications, usually a plurality of different phosphors are arranged in different sectors of a color wheel, which are illuminated sequentially by an excitation radiation source, such as e.g. a laser, upon the rotation of the color wheel. In this case, the phosphors convert the excitation radiation, which is usually in the blue and/or UV spectral range, into light having a longer dominant wavelength. By means of phosphors such as e.g. green phosphors, yellow phosphors and red phosphors, it is thus possible to generate light having a dominant wavelength in the green, yellow and red spectral range. This light emitted by the phosphors is then fed to an output of the light module, adjacent to which there is an integrator, for example. Furthermore, part of the excitation radiation can also be fed to the output. For this purpose, the color wheel usually has a through opening in one or a plurality of sectors, such that excitation radiation impinging on said through opening can be guided through the color wheel without being converted and can be guided to the output of the light module by means of suitable deflection of this beam.

Currently available green and red phosphors for LARP light modules have emission spectra which are not well suited to demanding projection applications. In this case, the dominant wavelength is too long in the green channel and too short in the red channel. In order to shift the dominant wavelengths of these phosphors, it is possible to use corresponding filters arranged on a filter wheel synchronized with the color wheel, e.g. upstream of the integrator. However, said filter wheel causes additional costs, additional space requirement and additional complexity in the driving of the filter wheel and the synchronization with the color wheel.

SUMMARY

Various embodiments relate to a light module having an excitation radiation source, a rotatable color wheel having a plurality of sectors which can be irradiated sequentially by the excitation radiation source upon a rotation of the color wheel. In this case, a wavelength conversion element is arranged in a first region at least in one of the sectors. Furthermore, at least one subregion of a second region of the color wheel is embodied as at least partly light-transmissive, and at least one part of the light emitted by the at least one wavelength conversion element can be guided through said subregion to an output of the light module.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
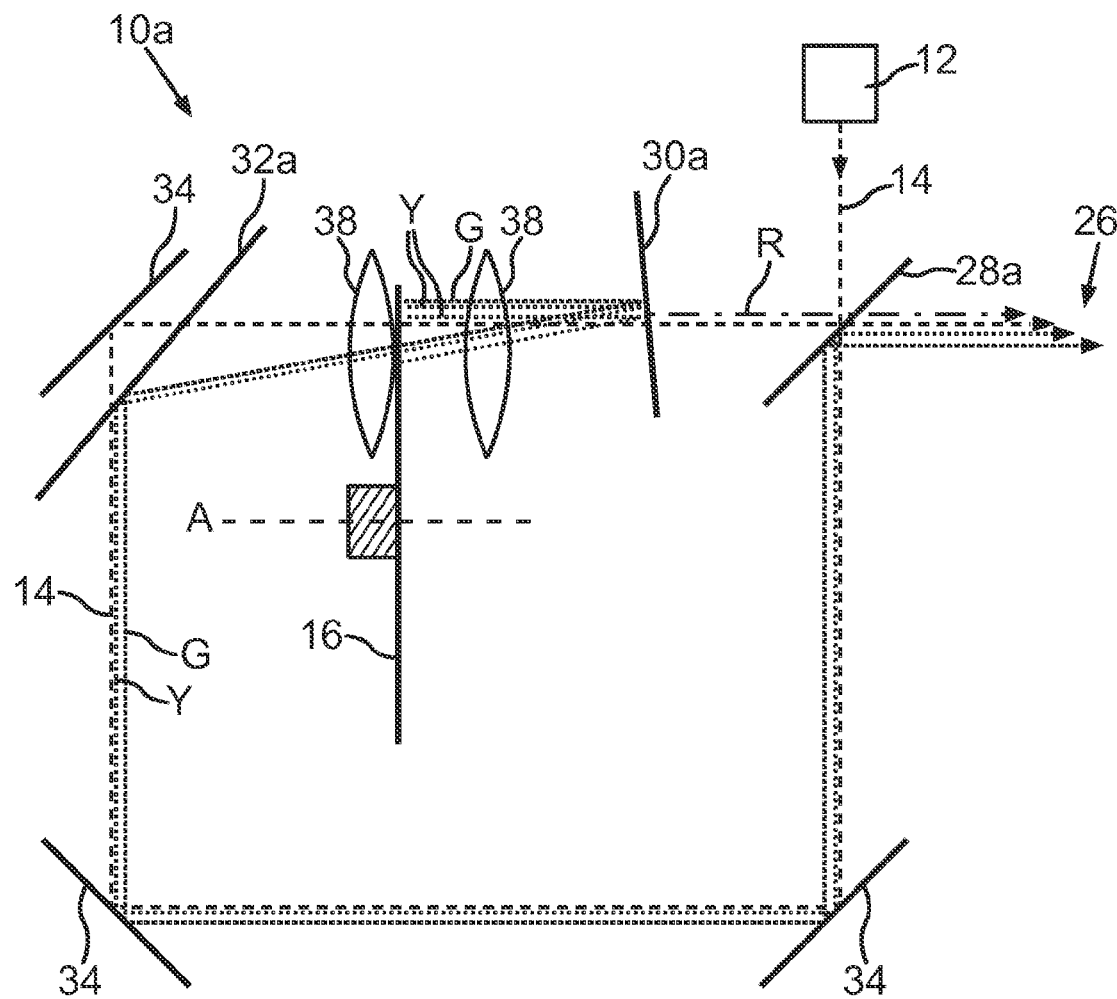
FIG. 1 shows a schematic illustration of a light module in accordance with a first embodiment.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

Various embodiments provide a light module for generating wavelength-converted light which makes it possible to enlarge the addressable color space with less complex means.

A light module according to various embodiments for generating wavelength-converted light includes an excitation radiation source for generating excitation radiation having at least one wavelength in a first wavelength range. Furthermore, the light module includes a color wheel, which is rotatable about a rotation axis and which is subdivided into a first region and a second region, which are arranged in a non-overlapping fashion and in a radial direction with respect to one another, such that one of the two regions constitutes an inner region of the color wheel and one of the two regions constitutes an outer region of the color wheel. The color wheel furthermore has a plurality of sectors, wherein a wavelength conversion element is arranged in the first region at least in one of the sectors of the color wheel, said wavelength conversion element being designed to convert radiation having a wavelength in the first wavelength range into light having a dominant wavelength in a second wavelength range, which differs from the first wavelength range. Furthermore, the light module is embodied in such a way that excitation radiation emitted by the excitation radiation source can be directed onto the color wheel in such a way that upon a rotation of the color wheel about the rotation axis the sectors can be irradiated sequentially and within the first region. Furthermore, at least one subregion of the second region is embodied as light-transmissive for at least one part of the visible wavelength spectrum, wherein the light module is furthermore embodied in such a way that at least one part of the emitted light converted by the at least one first wavelength conversion element can be guided through the at least one subregion of the second region embodied as light-transmissive for at least one part of the visible wavelength spectrum to an output of the light module.

The embodiment of the color wheel having a subregion in the second region of the color wheel that is light-transmissive for at least one part of the visible wavelength spectrum provides numerous possibilities for making it possible to filter an emission spectrum of a wavelength conversion element without an additional filter wheel, e.g. including for the case where the color wheel has a plurality of wavelength conversion elements for providing light of different colors, i.e. having different dominant wavelengths. In this case, various embodiments may make use of the fact that the color wheel is "synchronous with itself". As a result, the color wheel may provide additional functions which go beyond the carrier function for carrying wavelength conversion elements. In various embodiments, the at least one at least partly light-transmissive region and the guiding of at least one light path through the color wheel make it possible to use the color wheel simultaneously as a chopper wheel, which makes it possible e.g. to use static filters in order to make possible emission spectra even in the case of a plurality of rotating wavelength conversion elements, and moreover in a particularly efficient, compact and cost-effective design. Furthermore, the embodiment of the color wheel having at least one subregion of the second region that is light-transmissive for at least one subrange of the visible wavelength spectrum and the guiding of the light emitted by the wavelength conversion element through said subregion also make it possible, for example, to embody the color wheel simultaneously as a filter wheel as well, and thus to filter the light passed through.

In one configuration of various embodiments, in a plurality of sectors of the color wheel a respective wavelength conversion element is arranged within the first region of the color wheel, wherein at least one subregion of the second region is embodied as light-nontransmissive. In various embodiments, in this case the second region may also have a plurality of light-nontransmissive subregions and a plurality of at least partly light-transmissive subregions, i.e. subregions that are light-transmissive for at least one part of the visible wavelength spectrum. In this case, said subregions of the second region may be arranged such that the at least partly light-transmissive subregions and the light-nontransmissive subregions lie on a virtual circular line or a ring having the rotation axis as midpoint and a first radius. Furthermore, the wavelength conversion elements are also arranged in the first region such that they lie on a virtual circular line or a ring having the rotation axis as midpoint and having a second radius, which differs from the first radius. In this regard, what can be realized in a simple manner is that the excitation radiation is incident on the color wheel at a first distance, which corresponds to the second radius, from the rotation axis and the wavelength conversion elements are thus excited sequentially upon rotation of the color wheel. Furthermore, what can thus also be realized in a simple manner is that the light emitted by the wavelength conversion elements is incident at least partly on the color wheel again, to be precise at a distance from the rotation axis which corresponds to the first radius. Owing to the rotation of the color wheel and in particular owing to the rotation "synchronous with itself", each sector in the first region, e.g. each wavelength conversion element region or section here is assigned a corresponding subregion of the second region by virtue of the fact that at least one part of the light emitted from this sector or wavelength conversion element region impinges on the corresponding subregion of the second region, e.g. simultaneously, since the light propagation time is negligible. In this regard, the embodiment of the color wheel having light-nontransmissive and at least partly light-transmissive regions makes it possible to pre-define in a simple manner which light portion from which sector of the first region of the color wheel is or is not guided through the second region of the color wheel.

The light-nontransmissive region and the directing of the light onto this region also make it possible, for example, to separate spectral components by means of one and the same static filter and to remove the spectral components to be filtered by directing onto a light-nontransmissive region of the color wheel, wherein it is simultaneously possible to use, for specific conversion elements, the spectral components directed onto the color wheel by means of a corresponding light-transmissive embodiment of the corresponding subregions of the second region. This may enable a filtering of wavelength spectra without a separate filter wheel.

Furthermore, it may be provided if at least one sector in the first region has a through opening for transmitting the excitation radiation, wherein e.g. said sector is embodied as light-nontransmissive in the second region. Guiding the excitation radiation through said through opening, which e.g. likewise e.g. lies on the abovementioned virtual circular line or the ring having the second radius, may make it possible also to guide the non-converted excitation radiation to the output for combination with the other light colors and to use it.

In a further configuration of various embodiments, the light module has at least one first static filter element designed, for example, to reflect or to transmit light depending on the wavelength.

The use of a static, that is to say immobile or fixedly arranged, non-rotatable filter element, e.g. for filtering specific spectral components of an emission spectrum of a wavelength conversion element, is made possible here only by virtue of the above-described configuration of the color wheel. This is because a static filter element, if it is arranged in the beam path of the emission light of all the wavelength conversion elements, thus acts for all the wavelength conversion elements. However, since this filter reflects or transmits depending on the wavelength, the transmitted and/or the reflected partial light can be used and guided to the output. The fact, however, of when a transmitted or reflected component is to be used, e.g. by which wavelength conversion element, can be determined by virtue of the embodiment of the corresponding second region of the color wheel as light-transmissive or light-nontransmissive.

In one configuration of various embodiments, the light module is configured in such a way that part of the light emitted by the color wheel at least partly counter to a direction of incidence of the excitation radiation on the color wheel is guided on a first light path to the output of the light module, and part of the light is guided on a second light path to the output, said second light path differing at least partly from the first light path, wherein at least the second region of the color wheel is arranged at least partly in the first light path, and wherein the color wheel is not arranged in the second light path, and wherein e.g. the first and second light paths run identically from the color wheel as far as the at least one first static filter element and are separated by the at least one first static filter element. By virtue of this separation of the light paths in combination with the embodiment of the color wheel having at least partly light-transmissive and light-nontransmissive subregions, the filter effect for a respective wavelength conversion element can thus be controlled advantageously in a targeted manner.

In a further configuration, the light module is embodied in such a way that light emitted by the color wheel, incident on the first static filter element and transmitted by the first static filter element is guided on the first light path to the output, and light reflected by the first static filter element on the second light path impinges on at least one subregion of the second region of the color wheel.

This may provide a particularly simple and compact possibility for light guiding, since light which is emitted by the color wheel and which is to be incident again on the color wheel has to be returned, that is to say reflected, anyway.

In one configuration of various embodiments, the first static filter element has a filter plane, wherein a normal vector of said filter plane of a side of the first static filter element facing the color wheel is inclined relative to a direction of incidence of the excitation radiation on the first static filter element by an angle in the range of 0° up to but not including 45°, e.g. of 5° to 30° inclusive, e.g. of 10° to 20° inclusive, e.g. of 10° to 15° inclusive, in the direction of the rotation axis of the color wheel. In various embodiments, in this case, the normal vector, the rotation axis of the color wheel and the direction of incidence of the excitation radiation on the first static filter element can maintain lie in one plane. This constitutes a particularly simple and therefore advantageous configuration. However, other configurations can be provided, too, in which the normal vector does not lie in said plane and is tilted within the abovementioned angular ranges relative to the direction of incidence of the excitation radiation.

This configuration makes it possible for the light which is emitted by the color wheel and is reflected by the filter element to be reflected directly onto the color wheel, e.g. without further deflection mirrors, as a result of which a particularly cost-effective and compact projection arrangement may be provided.

Alternatively the normal vector of the filter element can also be arranged at an angle of 45° with respect to the beam path, i.e. in a manner tilted with respect to the direction of incidence of the excitation radiation on the filter wheel and/or on the first filter element itself in the direction of the rotation axis of the color wheel, and the light reflected by the filter element can be directed onto the color wheel again by a further deflection mirror, which may likewise be arranged at an angle of 45° with respect to the beam path. Although more optical elements are required for such an arrangement, the alignment complexity is reduced by the right-angled beam guiding.

In a further configuration of various embodiments, the light module is embodied in such a way that light which is emitted by the color wheel from a location of the at least one wavelength conversion element at a point in time, is incident on the first static filter element and is reflected by the first static filter element impinges on an impingement location in at least one subregion of the second region of the color wheel at said point in time at least partly on such a light path such that a lengthened connecting straight line between the location of the at least one wavelength conversion element and the impingement location does not run through the rotation axis of the color wheel. In other words, three-dimensional beam guiding can also be realized, e.g. such that the light reflected by the first static filter element is directed out of a first plane, which is formed by the rotation axis of the color wheel and the direction of incidence of the excitation radiation on the color wheel, for example by means of a deflection mirror, and is furthermore directed into a second plane, which is different from and parallel to said first plane, e.g. by means of a further deflection mirror. Three-dimensional beam guiding may have the advantage that this permits many more degrees of freedom with regard to the configuration of the beam paths and thus also of the optical elements with respect to one another, such that, by virtue of such a configuration, the light module and the arrangement of its individual components can be optimized and can be configured more compactly.

In a further configuration of various embodiments, at least one subregion of the second region of the color wheel which is embodied as light-transmissive for at least one part of the visible wavelength spectrum is embodied as a through opening in the color wheel. By virtue of this embodiment, the color wheel can be embodied simultaneously as a chopper wheel in a particularly simple and cost-effective manner. The filtering of specific emission spectra can then be realized in a simple manner, as described, in combination with the static filter element.

Alternatively or additionally, at least one subregion of the second region of the color wheel which is embodied as light-transmissive for at least one part of the visible wavelength spectrum can also have a filter element designed to transmit light in at least one predefinable wavelength range and not to transmit light having wavelengths from a wavelength range that differs from the at least one predefinable wavelength range. This makes it possible, for example, to realize the emission spectrum of a wavelength conversion element, e.g. that for providing red light at the output, by means of the statically arranged filter element and to realize the filtering of the emission spectrum of a further phosphor, e.g. that of a green phosphor, by means of the filter element situated in the subregion of the color wheel. Provision can also be made for arranging the corresponding filter elements for respective emission spectra to be filtered of respective wavelength conversion elements in the corresponding subregions of the second region. In this case, the filter element arranged in the color wheel can be embodied in any desired manner, e.g. as an absorption filter which absorbs spectral components to be filtered, or as an interference filter which reflects certain spectral components and transmits others.

Furthermore, the first static filter is embodied as an interference filter. By virtue of this embodiment, both the transmitted and the reflected light can be used. In this case, depending on the application, the static filter can be embodied as a long-pass filter, a short-pass filter, a bandpass filter and/or a band-stop filter, and can also be designed e.g. to transmit and/or to reflect one or a plurality of non-continuous wavelength ranges. Numerous possibilities for light guiding and filtering are available as a result.

The excitation radiation source may furthermore include a laser and/or laser diode, which emit(s) light in the blue spectral range, e.g. at 440 nm to 480 nm. This wavelength range is particularly well suited to the excitation of wavelength conversion elements, e.g. phosphors, and, furthermore, blue light in this wavelength range is well suited to be combined with the remaining colors provided at the output. Furthermore, lasers and laser diodes can provide a very narrowband excitation spectrum, e.g. concentrated substantially on one spectral line, as a result of which phosphors can be excited particularly effectively.

In a further configuration of various embodiments, at least one wavelength conversion element is embodied as a red phosphor and/or a yellow phosphor and/or a green phosphor designed to emit light having a dominant wavelength in the red and/or yellow and/or green spectral range, respectively. Particularly with the blue excitation radiation, these primary colors make it possible to provide a large color space which can also additionally be enlarged e.g. by above-described filter possibilities, e.g. of the red and/or green light.

In one configuration of various embodiments, however, the light module is embodied in such a way that red light provided at the output of the light module is provided by the light emitted by a yellow phosphor and filtered by a long-pass filter. The use of yellow phosphors for generating light in the red spectral range has the advantage that the luminous flux in the red channel can thereby be increased. Since yellow phosphors have a significantly higher conversion efficiency than red phosphors, a luminous flux advantage can thereby be achieved despite filtering, said advantage being manifested to a great extent particularly in the case of high excitation radiation power.

FIG. 1 shows a schematic illustration of a light module 10a in accordance with a first embodiment. The light module 10a includes an excitation radiation source 12, which may include e.g. a blue laser and/or one or a plurality of laser diodes emitting excitation radiation 14 in the blue spectral range, e.g. between 440 nm and 480 nm. Furthermore, the light module 10a may include a color wheel 16, which is rotatable about a rotation axis A, e.g. at a constant rotational frequency.

Figure 2:
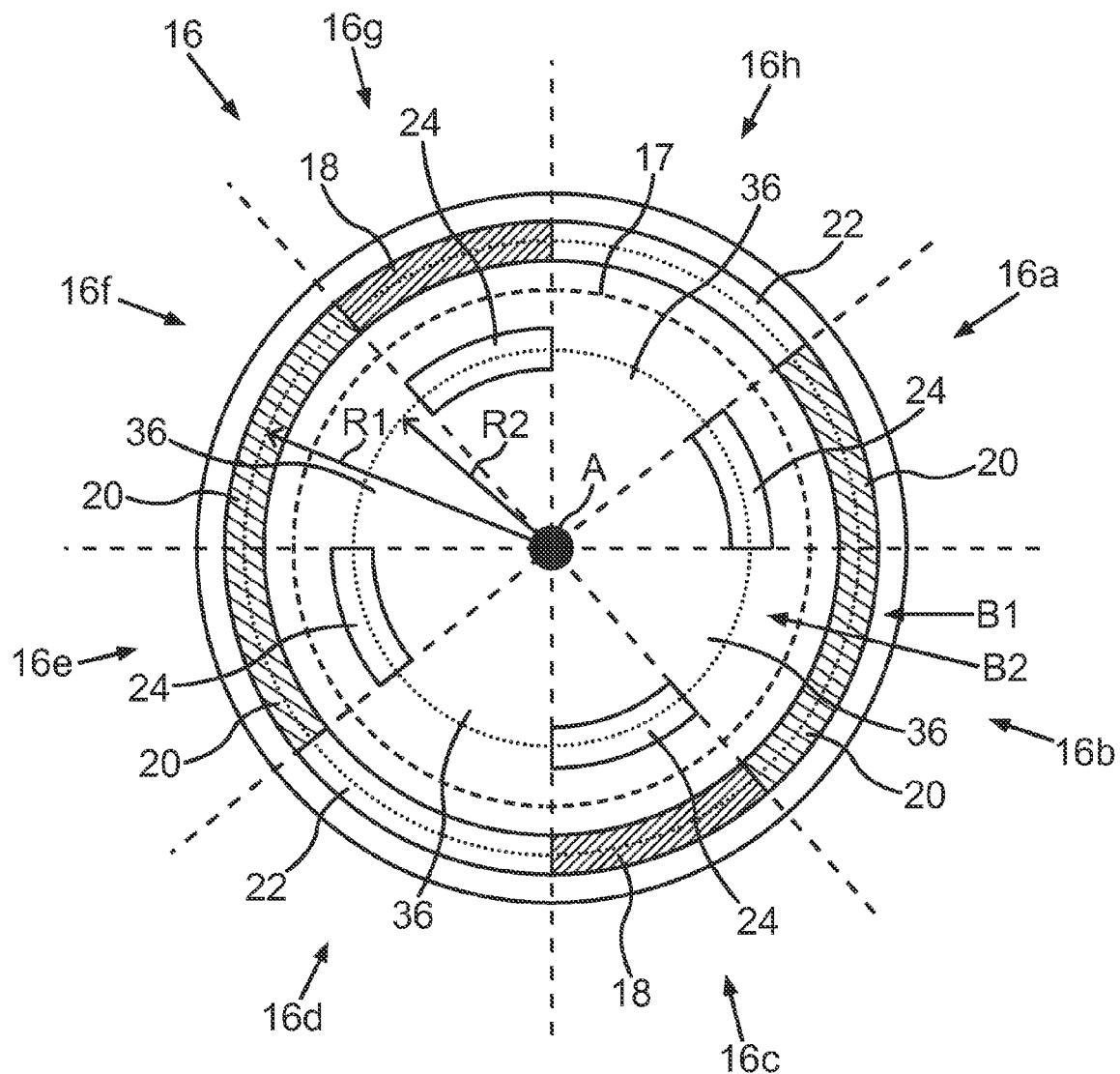
FIG. 2 shows a schematic illustration of a color wheel for a light module in accordance with FIG. 1 and FIG. 5.

Said color wheel 16 is illustrated in FIG. 2 in a plan view, i.e. in a plane perpendicular to the rotation axis A. The color wheel 16 can be subdivided into two regions, to be precise an outer first region B1 and an inner second region B2, which is intended to be clarified by the boundary line 17 between the two regions B1 and B2. Furthermore, the color wheel 16 has a plurality of sectors, here by way of example 8 sectors 16a, 16b, 16c, 16d, 16e, 16f, 16g and 16h.

In this example, two different wavelength conversion elements embodied as phosphors 18 and 20 are furthermore applied on the color wheel 16. They are embodied in a ring-segment-shaped fashion and are arranged within the first region B1 of the color wheel 16. In this case, a green phosphor 18 is respectively arranged in the sectors 16c and 16g and a yellow phosphor 20 is respectively arranged in the sectors 16a, 16b, 16e and 16f. In the sectors 16h and 16d there is respectively arranged a through opening 22 for the excitation radiation 14 to be passed through without being converted, likewise within the first region B1 of the color wheel 16 and likewise embodied in a ring-segment-shaped fashion. The phosphor segments 18 and 20 and the through opening segments 22 thus form at least one part of an outer ring around the rotation axis A; for example, they can be arranged adjacent to one another in the tangential direction, or else spaced apart from one another. In this case, they lie on an imaginary circular line having the rotation axis A as midpoint and a first radius R1.

Furthermore, through openings 24 are likewise arranged in the second region B2 of the color wheel 16, e.g. in each case in the sectors 16a, 16c, 16e and 16g. These through openings likewise lie on an imaginary circular line having the rotation axis A as midpoint, but with a second radius R2 smaller than the first radius R1.

This color wheel 16 serves, for example, to provide light having the colors red, green, yellow and blue at the output 26 of the arrangement in a temporal sequence. In this case, the light paths of the individual colors are represented by differently broken lines. In this case, R denotes light having a dominant wavelength in the red spectral range, G denotes light having a dominant wavelength in the green spectral range, and Y denotes light having a dominant wavelength in the yellow spectral range. Blue light used in this case is the excitation radiation 14 which can pass through the color wheel 16 in the sectors 16h and 16d through the through opening segments 22 in the first region B1 of said color wheel 16 and is guided to the output 26 by suitable optical elements. The green light is generated by excitation of the green phosphor 18, and the yellow light by excitation of the yellow phosphor 20, e.g. in the sectors 16a and 16e. In this example, the red light is likewise generated by excitation of the yellow phosphor 20, e.g. in the sectors 16b and 16f, and by subsequent filtering of the emission spectrum, such that only the long-wave spectral range of the yellow emission spectrum is provided at the output 26 of the arrangement. In order to be able to realize this without an additional filter wheel synchronized with the color wheel 16, a suitable filter arrangement and beam guiding is required, which is made possible e.g. by the arrangement illustrated in FIG. 1.

The light module 10a in accordance with the embodiment illustrated in FIG. 1 includes a plurality of optical elements for this purpose. The excitation radiation 14 emitted by the excitation radiation source 12 is firstly directed onto the color wheel 16 by means of a first filter element 28a.

Figure 3:
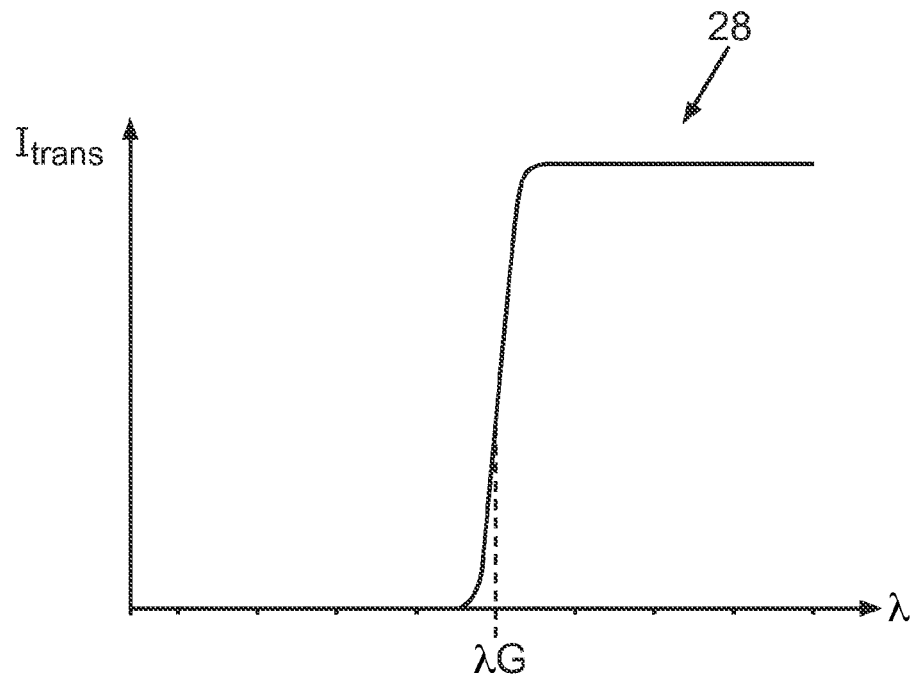
FIG. 3 shows a schematic illustration of a filter characteristic of the first filter element of the light module in accordance with FIG. 1 and FIG. 5.

In this case, the filter characteristic of said first filter element 28a is illustrated schematically in FIG. 3. In this case, the transmitted intensity Itrans is illustrated as a function of the wavelength λ. As can be discerned in FIG. 3, said first filter element 28a is embodied as a long-pass filter, e.g. having a limiting wavelength λG that may be approximately 590 nm to 605 nm, i.e. the first filter element 28a transmits substantially only light in the red spectral range and reflects light having wavelengths shorter than the limiting wavelength λG.

In this case, said first filter element 28a is arranged at an angle of 45° in the beam path relative to the incident excitation radiation 14, i.e. the normal vector of the first filter element 28a forms an angle of 45° with the direction of incidence of the excitation radiation 14 on the first filter element 28a. After the deflection of the excitation radiation 14 by said first filter element 28a by reflection, the excitation radiation 14 passes through a second filter element 30a, which is likewise embodied as transmissive for blue light. In this case, the filter characteristic of said second filter element 30a is illustrated schematically in FIG. 4. Said second filter element 30a is embodied here as a band-stop filter that transmits light in a wavelength range up to a first limiting wavelength λG1 and in a wavelength range starting from a second limiting wavelength λG2 and reflects light in the intervening wavelength range, e.g. in the green and yellow wavelength range.

After the excitation radiation 14 has passed through said second filter element 30a, it impinges on the color wheel 16 at least approximately at the distance R1 with respect to the rotation axis A and passes through said color wheel and thus sequentially illuminates the sectors 16a, 16b, 16c, 16d, 16e, 16f, 16g and 16h with the wavelength conversion elements and the through opening 22 in the first region B1 of the color wheel 16 upon a rotation of the color wheel 16.

Figure 4:
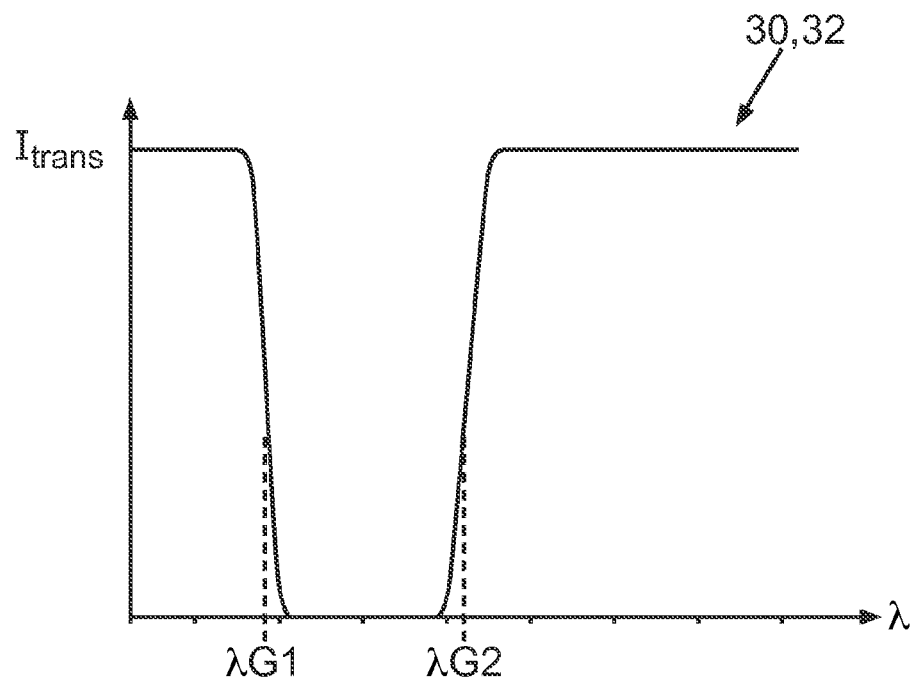
FIG. 4 shows a schematic illustration of a filter characteristic of the second filter element of the light module in accordance with FIG. 1 and FIG. 5.

In this case, if the excitation radiation 14 impinges on one of the sectors 16d or 16h of the color wheel 16 which has the through opening 22 in the first region B1, then the excitation radiation 14 passes through the color wheel 16, passes through a third filter element 32a, which is embodied as transmissive at least for blue light, and is furthermore directed by three deflection mirrors 34, the mirror surface of which is in each case arranged at an angle of 45° with respect to the beam path, once again onto the first filter element 28a, which is embodied as reflective for blue light as described. Said filter element ultimately reflects the excitation radiation 14 to the output 26 of the arrangement. In this case, the third filter element 32a can be embodied with a filter characteristic like e.g. the second filter element 30a and as illustrated in FIG. 4, or else as a short-pass filter that transmits only the excitation radiation 14 and reflects light having longer wavelengths.

The generation of the light in the red spectral range is realized here as follows: the excitation radiation 14 emitted by the excitation radiation source 12 is directed onto the color wheel 16, as described. If, in the course of being incident on the color wheel 16, the excitation radiation 14 then impinges on a sector with the yellow phosphor 20, e.g. on the sectors 16b and 16f, the yellow phosphor 20 is excited and emits light having a dominant wavelength in the yellow spectral range. In this case, this yellow emission spectrum typically also includes red and green spectral components. This light emitted by the yellow phosphor 20 is radiated in the direction of the second filter element 30a and impinges on the latter. Said second filter element 30a is embodied as a band-stop filter, as described, such that only the red spectral component of the yellow emission spectrum is transmitted through this second filter element 30a. This red spectral component furthermore passes through the first filter element 28 and is provided at the output 26. Through a suitable choice of the first or second filter element 28 or 30 and the limiting wavelength λG or λG2, respectively, it is possible to define or determine the dominant wavelength of the red light provided at the output 26. Consequently, filtering makes it possible to provide red light having a spectral distribution having a desired dominant wavelength at the output 26, which may be more efficient than that from emission from customary red phosphors.

In this case, instead of the yellow phosphors 20, red or orange phosphors 42 (cf. FIG. 8) could also be arranged in the segments 16b and 16f and their emission spectrum could additionally be filtered, as described, in order to shift the dominant wavelength toward higher wavelengths. However, the use of yellow phosphors 20 for generating light in the red spectral range has the advantage that the luminous flux in the red channel can thereby be increased. Since yellow phosphors 20 have a significantly higher conversion efficiency than red phosphors 42, a luminous flux may be achieved by the use of yellow phosphors 20 despite the light losses as a result of the filtering, said effect being especially manifested e.g. at high excitation radiation power.

In order to provide yellow light at the output 26, firstly the yellow phosphor 20 of the color wheel 16, e.g. in the sectors 16a and 16e, is excited. The light emitted by the yellow phosphor 20 impinges, as also described above with regard to the red light, on the second filter element 30a, which e.g. reflects yellow spectral components and transmits red spectral components. In this case, there is then the problem that for the purpose of generating the red light the light reflected at the second filter element 30 must not be guided to the output 26 since, after all, the yellow spectral component is intended to be removed. For the purpose of providing yellow light at the output 26, however, the yellow light reflected by the second filter element 30a must be guided to the output 26. This problem may be solved by virtue of the fact that, as a result of the embodiment of the second region B2 having light-transmissive subregions 24 and light-nontransmissive subregions 36, the color wheel 16 simultaneously functions as a chopper wheel. The yellow light that is intended to contribute to the total light at the output 26 may therefore be passed through and guided to the output 26, while the yellow light filtered for the red light impinges on a light-nontransmissive subregion 36 of the second region B2 of the color wheel 16.

In other words, once the light emitted by the yellow phosphor 20 from the sectors 16a and 16e has been reflected by the second filter element 30a and passed through the color wheel 16 through the through openings 24 in the sectors 16a and 16e, said light impinges on the third filter element 32a, which reflects yellow light, and is guided by the deflection mirrors 34 and by reflection at the first filter element 28 to the output 26. In this case, it should also be noted that the spectrum of the light emitted by the yellow phosphor 20 in the sectors 16a and 16e likewise has a red spectral component. In this case, said red spectral component is transmitted by the second and first filter elements 30a and 28a and is guided to the output 26, where said red structural component is combined again with the remaining yellow (and green) spectral component that was reflected at the second filter element 30a.

The green light emitted by the green phosphor 18 upon excitation takes a similar course. This light is firstly reflected at the second filter element 30a, e.g. almost completely, since the green light has hardly any red spectral component, and is guided to the color wheel 16. In this case, the green light is passed through the color wheel through the through openings 24 in the sectors 16c and 16g and impinges on the third filter element 32a, is reflected by the latter, is deflected by the deflection mirrors 24 and is ultimately guided by reflection at the first filter element 28a to the output 26.

In this first embodiment, the second filter element 30a is arranged at an angle of between 45° and 90° in the beam path. To put it more precisely, that side of the first static filter element 30a which faces the color wheel 16 has a filter plane, the normal vector of which is inclined relative to the direction of incidence of the excitation radiation 14 on the first static filter element 30a and e.g. also on the color wheel 16 by an angle in the range of 0° up to but not including 45°, e.g. of 5° to 30° inclusive, e.g. of 10° to 20° inclusive, e.g. of 10° to 15° inclusive, in the direction of the rotation axis A of the color wheel 16, such that the light reflected by the second filter element 30a is reflected in a manner tilted with respect to the original direction of incidence on the color wheel 16 without further deflection mirrors, e.g. at the distance R2 from the rotation axis A. In this example, here e.g. the normal vector, the rotation axis A of the color wheel 16 and the direction of incidence of the excitation radiation 14 on the first filter element 30a or on the color wheel 16 lie in one plane.

Figure 5:
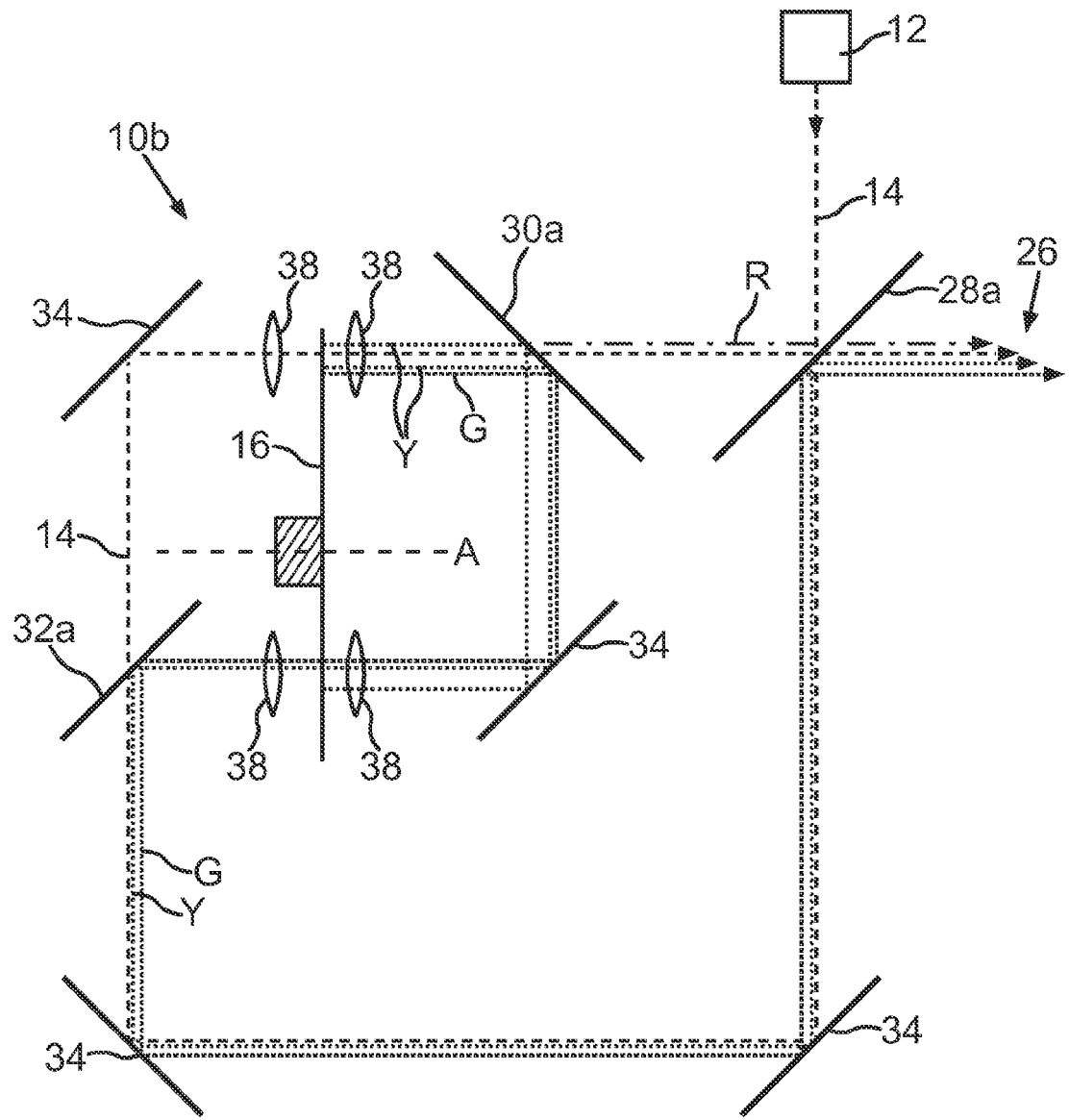
FIG. 5 shows a schematic illustration of a light module in accordance with a second embodiment.

Alternatively, in order to simplify the alignment, it is also possible to provide a right-angled beam path by means of an arrangement of the second filter element 30a at an angle of 45° and by means of a further deflection mirror 34, as is illustrated schematically in FIG. 5.

Furthermore, this arrangement has even further optical elements, e.g. lenses 38, two of which are illustrated here by way of example. These serve primarily to collimate the light and to provide as parallel beam guiding as possible in the beam path. Furthermore, however, even further optical elements (not illustrated) can be arranged in the beam paths.

As a result of the filtering by means of static, immobile filter elements 28a, 30a, 32a, a further major advantage is also afforded here, since said filter elements are arranged in the parallel beam path, i.e. at locations at which the light rays run substantially parallel. As a result, the filter property of the filter elements 28a, 30a, 32a can be improved since the filter characteristic of a filter element 28a, 30a, 32a is typically implemented for a specific angle of impingement on the filter element 28a, 30a, 32a, i.e. a filter element 28a, 30a, 32a has substantially only for this angle of impingement the transmission and reflection properties predefined by the filter characteristic. For other angles of impingement, the limiting wavelengths $\lambda G$, $\lambda G1$, $\lambda G2$ are shifted in this case. As a result of the arrangement of the filter elements 28a, 30a, 32a in the parallel beam path, the angle of impingement is the same for all light rays and the filter elements 28a, 30a, 32a can be optimized for this angle of impingement. In applications with a synchronized filter wheel, by contrast, the latter is typically arranged upstream of the integrator onto which the light rays are focused. The focusing in this case gives rise to different angles of impingement on the filter wheel, which impairs the filter properties.

This light module 10a therefore makes it possible, by means of an arrangement of static filter elements 28a, 30a, 32a, to provide light in the red spectral range from the emission spectrum of the yellow phosphor 20 at the output 26 of the arrangement, e.g. with a dominant wavelength predefinable by the embodiment of the filter elements 28a, 30a, and moreover in a particularly cost-effective, compact and simple manner, e.g. without an additional filter wheel. By way of example, if the green light generated by the green phosphor 18 is intended also to be filtered, then a corresponding filter can be arranged in the sectors 16c and 16g instead of the through openings 24 situated in the second region B2, e.g. a short-pass filter having a limiting wavelength in the long-wave green spectral range. Consequently, the color wheel 16 can function not only as a chopper wheel but also simultaneously as a filter wheel.

FIG. 5 shows a schematic illustration of a light module 10b in accordance with a further embodiment. In this case, the construction and the beam guiding is analogous to that described with respect to FIG. 1, with the difference that here the second filter element 30a is arranged at an angle of 45° in the beam path, and the light reflected by the second filter element 30a is directed onto the color wheel 16 by a further deflection mirror 34. In this case, the color wheel 16 can once again be embodied as illustrated in FIG. 2 and described above.

A further difference in the case of this construction is also that, in contrast to the embodiment illustrated in FIG. 1, the light emitted from the first region B1 of a respective sector 16a, 16b, 16c, 16e, 16f and 16g of the color wheel 16, for the case where said light is reflected by the second filter element 30a, is directed onto a subregion of the second region B2 of the color wheel 16 which is situated in the respective opposite sector 16a, 16b, 16c, 16e, 16f and 16g of the color wheel 16, i.e. the light emitted from sector 16a is guided partly through the through opening 24 in sector 16e and the light emitted from sector 16e is guided partly through the through opening in the sector 16a, etc. By contrast, in the embodiment in accordance with FIG. 1, the light emitted from a respective sector 16a, 16b, 16c, 16e, 16f and 16g is guided onto a light-transmissive or light-non-transmissive subregion of the second region B2 in the respective same sector 16a, 16b, 16c, 16e, 16f and 16g.

What also proves to be particularly advantageous here is the embodiment of the color wheel 16 as point-symmetrical, i.e. each sector 16a, 16b, 16c, 16d, 16e, 16f, 16g and 16h of the color wheel 16 is identical in terms of its embodiment to the sector 16a, 16b, 16c, 16d, 16e, 16f, 16g and 16h opposite it, since this embodiment can thus also be maintained in the case of different beam guides.

Figure 6:
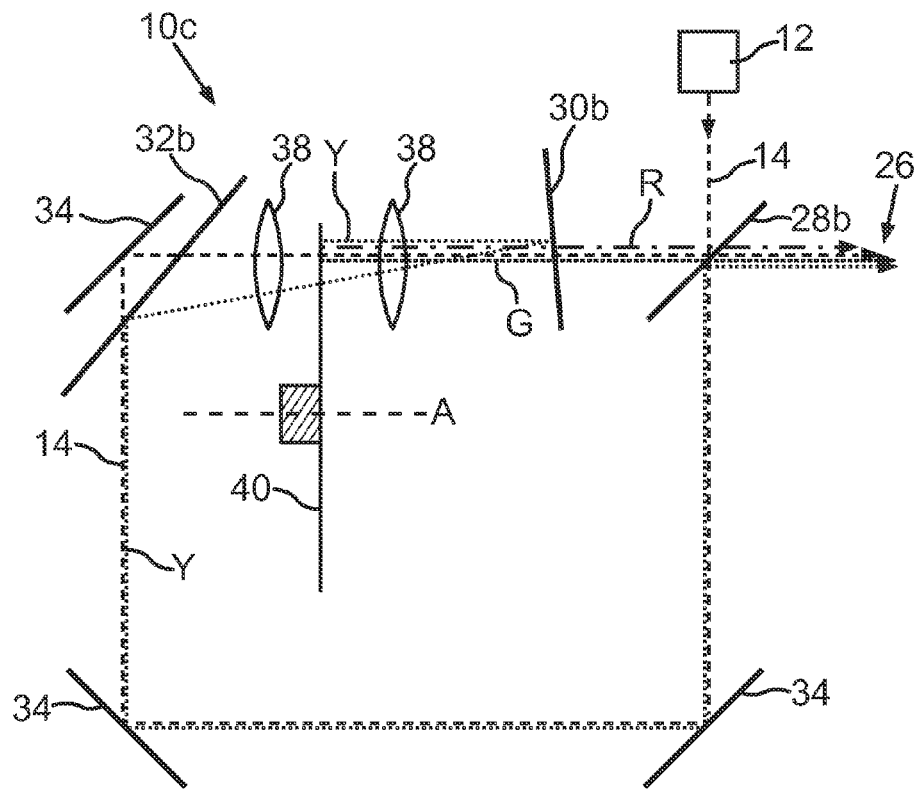
FIG. 6 shows a schematic illustration of a light module in accordance with a third embodiment.

However, an arbitrary number of other possibilities for the embodiment of the color wheel 16 are conceivable. Although planar beam guides, as in FIG. 1 and FIG. 5, and e.g. also in FIG. 6, are particularly simple and therefore advantageous, a "three-dimensional" beam guide would also be possible, i.e. for example the light path—illustrated in FIG. 5—of the light reflected by the second filter element 30a can also be directed out of the plane of the illustration and onto the color wheel 16 by means of a suitable deflection mirror arrangement. In other words, that location of the phosphor 18, 20 from which light is emitted at a point in time and the point of impingement or pressing-through point of this deflected (partial) light impinging on or passed through the color wheel 16 at this point in time need not necessarily lie on a straight line through the rotation axis A, but rather can form any arbitrary angle with one another in relation to the rotation axis A, e.g. with the point of intersection of the rotation axis with the color wheel 16 as vertex. In other words, the light reflected by the second filter element 30a can be guided onto the color wheel 16 on a light path which at least partially does not lie in the plane which is formed by the rotation axis A of the color wheel 16 and the direction of incidence of the excitation radiation 14 on the color wheel 16, i.e. the impingement point and passing-through point also do not lie in said plane.

FIG. 6 shows a schematic illustration of a light module 10c in accordance with a further embodiment. In this case, the emission spectrum both of the red phosphor 42 and of the green phosphor 18 is filtered by a static filter element 30b. For this purpose, the light module 10c once again includes an excitation radiation source 12, which emits blue light, a color wheel 40, a first, second and third filter element 28b, 30b and 32b, and deflection mirrors 34. In this case, the arrangement of these components with respect to one another is analogous to that in accordance with FIG. 1, but here at least the first and second filter elements 28b and 30b in each case have a different filter characteristic and the embodiment of the color wheel 40 also differs. In various embodiments, here a yellow notch filter is arranged as second filter element 30b in the beam path, said filter having the filter characteristic illustrated schematically in FIG. 7. In this case, this second filter element 30b reflects only in a very narrowband wavelength range delimited by the two limiting wavelengths $\lambda G3$ and $\lambda G4$; for example, this second filter element 30b reflects substantially only yellow light. Advantageously, in this case, by means of the limiting wavelengths $\lambda G3$ and $\lambda G4$ it is possible to define which spectral component is respectively filtered from the green and red emission spectrum, such that the dominant wavelength of the green emission spectrum shifts to lower wavelengths as a result of the predefinition of the limiting wavelength λG3 and the dominant wavelength of the red emission spectrum is shifted toward higher wavelengths as a result of the corresponding predefinition of the limiting wavelength λG4. Since here the reflected yellow light is not lost for the purpose of providing this at the output 26, the limiting wavelengths λG3 and λG4 for shifting the red and green spectra can be chosen virtually arbitrarily.

In this case, the first filter element 28b is embodied such that it reflects light in the blue and yellow spectral range and transmits light in the red and green spectral range. The excitation radiation 14 emitted by the excitation radiation source 12 is thus reflected by the first filter element 28b, passes through the second filter element 30b and is incident on the color wheel 40 at the distance R1 from the rotation axis A of said color wheel.

Figure 8:
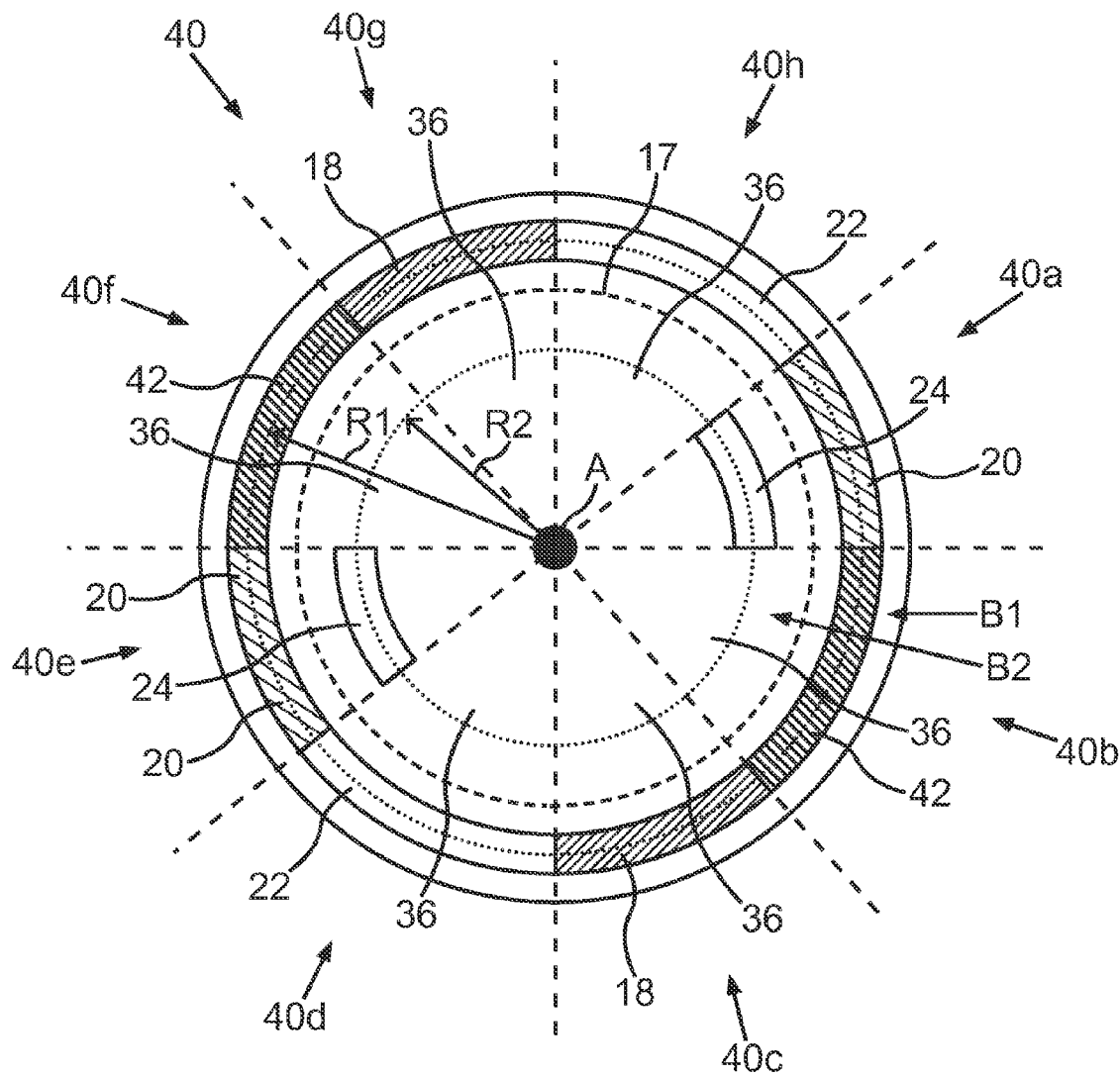
FIG. 8 shows a schematic illustration of a color wheel for a light module in accordance with FIG. 6.

In this case, the color wheel 40 is embodied as illustrated schematically in FIG. 8. It once again has an outer first region B1 and an inner second region B2 and is subdivided into eight sectors 40a, 40b, 40c, 40d, 40e, 40f, 40g and 40h. In this case, a respective green phosphor 18 is arranged in the first region B1 and in the sectors 40c and 40g, a respective red phosphor 42 is arranged in the sectors 40b and 40f and a respective yellow phosphor 20 is arranged in the sectors 40a and 40e. A respective through opening 22 for passing through the excitation radiation 14 without being converted is situated in the sectors 40d and 40h. Furthermore, a respective through opening 24 is arranged in the second region B2 of the color wheel 40 in the sectors 40a and 40e, while the remaining subregions 36 of the second region B2 are embodied as light-nontransmissive.

If the excitation radiation 14 then impinges on one of the through openings 22 in the sectors 40d and 40h in the first region B1, then it passes through the color wheel 40 without being converted, furthermore passes through the third filter element 32b, is directed onto the first filter element 28b again by the deflection mirrors 34 and is reflected by said filter element to the output 26. In this case, the third filter element 32b is embodied such that at least light in the blue spectral range is transmitted and light in the yellow spectral range is reflected, and can be embodied e.g. as a corresponding short-pass filter or else as a band-stop filter, e.g. also as a notch filter.

If the excitation radiation 14 impinges on a red phosphor 42 in the segments 40b and 40f in the first region B1 of the color wheel 40, then the excitation radiation 14 is converted into light in the red spectral range and emitted. The light emitted by the red phosphor 42 once again impinges on the second filter element 30b. The latter transmits only the spectral component of the red light above the limiting wavelength λG4. In this case, said limiting wavelength λG4 is chosen such that the transmitted spectral component of the red emission spectrum has a predefinable higher dominant wavelength than the red emission spectrum before the filtering. This transmitted component then furthermore passes through the first filter element 28b and is thus provided at the output 26 of the arrangement. The component filtered by the second filter element 30b, i.e. the reflected component, of the red emission spectrum, is reflected such that it is incident on the color wheel 40 at the distance R2 from the rotation axis A thereof and impinges e.g. on a light-nontransmissive subregion 36 of the second region B2 of the color wheel 40. In accordance with this exemplary configuration, this reflected component is incident on the same sector from which it was emitted by the red phosphor, i.e. light emitted from the sector 40b is partly incident on the sector 40b and light emitted from the sector 40f is again partly incident in the sector 40f. In this case, of course, other configurations of this light path, e.g. analogously to FIG. 5, are also possible again, or else a three-dimensional beam guide, for which purpose the through openings 24 must then be arranged in a manner rotated correspondingly by an angle relative to the sectors or the present exemplary embodiment illustrated in FIG. 8.

As a result of the impingement of that component of the red emission spectrum which is reflected by the second filter element 30b on a light-nontransmissive subregion 36, this component is thus filtered and not guided further to the output 26 of the arrangement.

If the excitation radiation 14 impinges on a green phosphor 18 in the first region B1 of the color wheel 40, then the excitation radiation 14 is absorbed and light having a dominant wavelength in the green spectral range is emitted. This light impinges on the second filter element 30b, which transmits the green spectral component up to the lower limiting wavelength λG3 of the filter characteristic. In this case, too, this limiting wavelength λG3 is predefined such that the transmitted green spectrum has a lower dominant wavelength than the spectrum emitted by the green phosphor 18. The reflected, e.g. yellow, component of the green emission spectrum is incident upon the color wheel 40 at the distance R2 from the rotation axis A of said color wheel and impinges on a light-nontransmissive subregion 36 of the second region B2 and is thus filtered and thus does not pass to the output 26 of the arrangement.

If the excitation radiation 14 impinges on a yellow phosphor 20 of the color wheel 40, then the excitation light 14 is converted into light having a dominant wavelength in the yellow range, and this light is emitted. The yellow light is then intended not to be filtered. This is realized by the yellow light impinging on the second filter element 30b, which transmits the red and green spectral component of the yellow light and reflects the remaining yellow spectral component. The reflected component impinges at the distance R2 on the color wheel 40, e.g. on a through opening 24 in the second region B2, thus passes through the color wheel 40 and is reflected by the third filter element 32b, the deflection mirrors 34 and the first filter element 28b. At said first filter element 28b, in this case the yellow spectral component of the yellow light is combined again with the red and green spectral component of the yellow light transmitted by the second filter element 30b and is thus available at the output 26 in an unfiltered manner, i.e. with an unchanged, identical dominant wavelength in comparison with that of the emission spectrum of the light emitted by the yellow phosphor 20.

Figure 7:
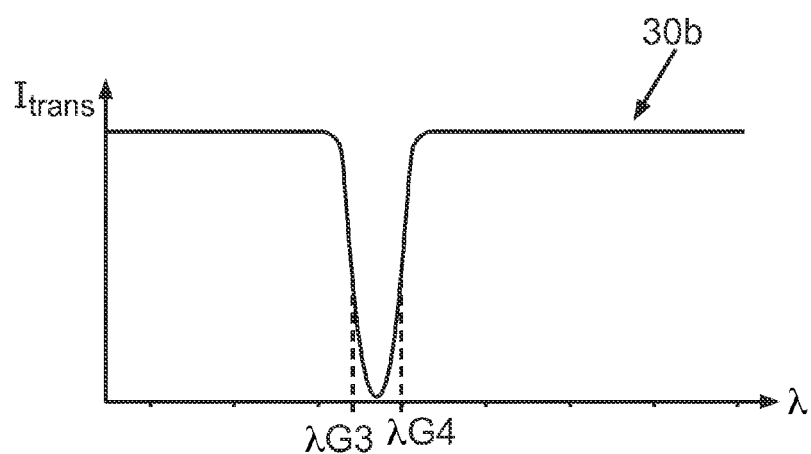
FIG. 7 shows a schematic illustration of the filter characteristic of a yellow notch filter for a light module in accordance with FIG. 6.
Figure 9:
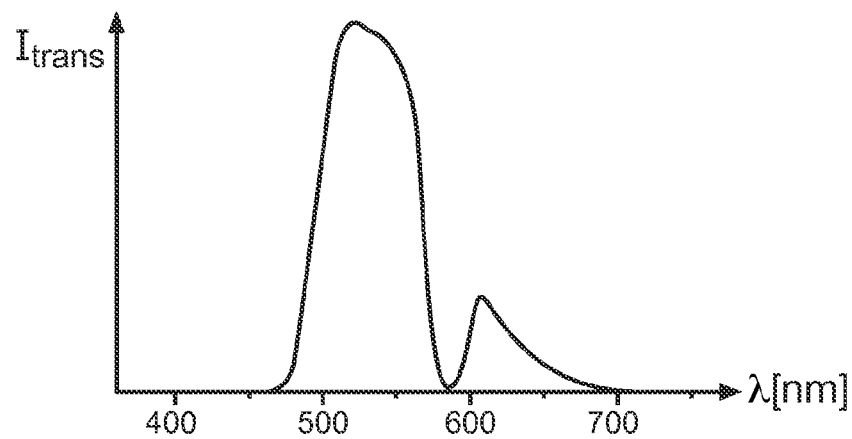
FIG. 9 shows a schematic illustration of an emission spectrum of a green phosphor that is filtered by means of a yellow notch filter.
Figure 10:
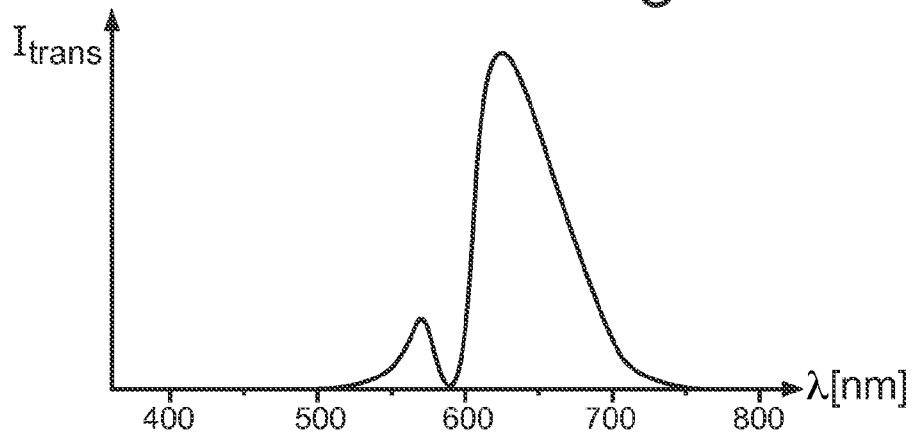
FIG. 10 shows a schematic illustration of an emission spectrum of a red phosphor that is filtered by means of a yellow notch filter.
Figure 11:
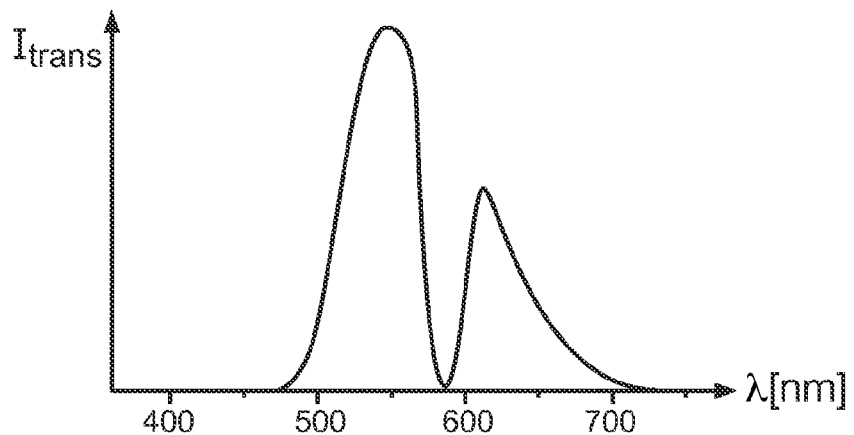
FIG. 11 shows a schematic illustration of an emission spectrum of a yellow phosphor that is filtered by means of a yellow notch filter.

FIG. 9, FIG. 10 and FIG. 11 are intended here once again to illustrate the manner of operation of the yellow notch filter 30b. In this case, FIG. 9 shows the emission spectrum of the green phosphor filtered by the notch filter with a filter characteristic in accordance with FIG. 7, FIG. 10 shows that of the red phosphor, and FIG. 11 that of the yellow phosphor. As can be seen in FIG. 9, a large part of the light in the yellow wavelength range is removed, i.e. reflected, during the filtering of the green emission spectrum. As a result, this filtered spectrum has a shorter dominant wavelength than the original green emission spectrum; for example, the dominant wavelength is shifted from 555 nm to 545 nm.

As can be seen in FIG. 10, a large part of the yellow spectral component is also removed from the red emission spectrum by reflection. This filtered red spectrum illustrated thus has a dominant wavelength which is greater than that of the original red emission spectrum of the red phosphor; for example, the dominant wavelength was shifted here from 599 nm to 606 nm.

As a result of this filtering of the green and red emission spectra, it is thus possible to provide green and red light which is significantly better suited to demanding projection applications, since a significantly larger color space can be addressed as a result of the described shift of the dominant wavelengths and as a result of the combination of this light with blue and yellow light. In addition, the green light having the low dominant wavelength is significantly better saturated.

Overall, various embodiments thus make it possible for wavelength-converted light to be provided and filtered, such that it is possible to provide an enlargement of the addressable color space with an additional increase in the color saturation, and moreover in an extremely compact, simple, cost-effective manner which is made possible e.g. by virtue of the saving of a second wheel and the resultant lower complexity of the construction.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A light module for generating wavelength-converted light, the light module comprising:
   an excitation radiation source configured to generate excitation radiation having at least one wavelength in a first wavelength range;
   a color wheel, which is rotatable about a rotation axis and which is subdivided into a first region and a second region, which are arranged in a non-overlapping fashion and in a radial direction with respect to one another, such that one of the two regions constitutes an inner region of the color wheel and one of the two regions constitutes an outer region of the color wheel;
   wherein the color wheel has a plurality of sectors, wherein a wavelength conversion element is arranged in the first region at least in one of the sectors of the color wheel, said wavelength conversion element being designed to convert radiation having a wavelength in the first wavelength range into light having a dominant wavelength in a second wavelength range, which differs from the first wavelength range;
   wherein the light module is embodied in such a way that excitation radiation emitted by the excitation radiation source can be directed onto the color wheel in such a way that upon a rotation of the color wheel about the rotation axis the sectors can be irradiated sequentially and within the first region; and
   wherein at least one subregion of the second region is embodied as light-transmissive for at least one part of the visible wavelength spectrum, wherein the light module is embodied in such a way that at least one part of the emitted light converted by the at least one wavelength conversion element can be guided through the at least one subregion of the second region embodied as light-transmissive for at least one part of the visible wavelength spectrum to an output of the light module;
   wherein the light module has at least one first static filter element designed depending on the wavelength in the first wavelength range;
   wherein the light module is configured in such a way that part of the light emitted by the color wheel at least partly counter to a direction of incidence of the excitation radiation on the color wheel is guided on a first light path to the output of the light module, and part of the light is guided on a second light path to the output, said second light path differing at least partly from the first light path,
   wherein at least the second region of the color wheel is arranged at least partly in the first light path, and
   wherein the color wheel is not arranged in the second light path;
   wherein the first and second light paths run identically from the color wheel as far as the at least one first static filter element and are separated by the at least one first static filter element.

2. The light module of claim 1,
   wherein in a plurality of sectors of the color wheel a respective wavelength conversion element is arranged within the first region of the color wheel, and
   wherein at least one subregion of the second region is embodied as light-nontransmissive.

3. The light module of claim 1,
   wherein in the first region of the color wheel at least one sector has a through opening for passing through the excitation radiation;
   wherein said at least one sector is embodied as light-nontransmissive in the second region.

4. The light module of claim 3,
   wherein the first static filter element has a filter plane, wherein a normal vector of said filter plane of a side of the first static filter element facing the color wheel is inclined relative to a direction of incidence of the excitation radiation on the first static filter element by an angle in the range of 0° up to but not including 45°;
   wherein the normal vector, the rotation axis of the color wheel and the direction of incidence of the excitation radiation on the first static filter element lie in one plane.

5. The light module of claim 3,
   wherein the light module is embodied in such a way that light which is emitted by the color wheel from a location of the at least one wavelength conversion element at a point in time, is incident on the first static filter element and is reflected by the first static filter element impinges on an impingement location in at least one subregion of the second region of the color wheel at said point in time at least partly on such a light path such that a lengthened connecting straight line between the location of the at least one wavelength conversion element and the impingement location does not run through the rotation axis of the color wheel.

6. The light module of claim 1,
   wherein in the first region of the color wheel at least one sector has a through opening for passing through the excitation radiation;
   wherein said at least one sector is embodied as light-nontransmissive in the second region.

7. The light module of claim 1,
   wherein at least one subregion of the second region of the color wheel which is embodied as light-transmissive for at least one part of the visible wavelength spectrum is embodied as a through opening in the color wheel.

8. The light module of claim 1,
wherein the at least one subregion of the second region of the color wheel which is embodied as light-transmissive for at least one part of the visible wavelength spectrum has a filter element designed to transmit light in at least one predefinable wavelength range and not to transmit light having wavelengths from a wavelength range that differs from the at least one predefinable wavelength range.

9. The light module of claim 1,
wherein the excitation radiation source comprises at least one of a laser or a laser diode, which emit(s) light in the blue spectral range.

10. The light module of claim 1,
wherein at least one wavelength conversion element is embodied as a red phosphor and/or a yellow phosphor and/or a green phosphor designed to emit light having a dominant wavelength in the red and/or yellow and/or green spectral range, respectively.

11. The light module of claim 1,
wherein the light module is embodied in such a way that red light provided at the output of the light module is provided by the light emitted by a yellow phosphor and filtered by a filter element.

12. A light module for generating wavelength-converted light, the light module comprising:
an excitation radiation source configured to generate excitation radiation having at least one wavelength in a first wavelength range;
a color wheel, which is rotatable about a rotation axis and which is subdivided into a first region and a second region, which are arranged in a non-overlapping fashion and in a radial direction with respect to one another, such that one of the two regions constitutes an inner region of the color wheel and one of the two regions constitutes an outer region of the color wheel;
wherein the color wheel has a plurality of sectors, wherein a wavelength conversion element is arranged in the first region at least in one of the sectors of the color wheel, said wavelength conversion element being designed to convert radiation having a wavelength in the first wavelength range into light having a dominant wavelength in a second wavelength range, which differs from the first wavelength range;
wherein the light module is embodied in such a way that excitation radiation emitted by the excitation radiation source can be directed onto the color wheel in such a way that upon a rotation of the color wheel about the rotation axis the sectors can be irradiated sequentially and within the first region; and
wherein at least one subregion of the second region is embodied as light-transmissive for at least one part of the visible wavelength spectrum, wherein the light module is embodied in such a way that at least one part of the emitted light converted by the at least one wavelength conversion element can be guided through the at least one subregion of the second region embodied as light-transmissive for at least one part of the visible wavelength spectrum to an output of the light module;
wherein in the first region of the color wheel at least one sector has a through opening for passing through the excitation radiation;
wherein said at least one sector is embodied as light-nontransmissive in the second region;
wherein the light module is embodied in such a way that light emitted by the color wheel, incident on a first static filter element and transmitted by the first static filter element is guided on a first light path to the output, and light reflected by the first static filter element on a second light path impinges on at least one subregion of the second region of the color wheel.

13. The light module of claim 12,
wherein the light module has at least one first static filter element designed depending on the wavelength in the first wavelength range;
wherein the at least one first static filter element is designed to reflect or to transmit light depending on the wavelength in the first wavelength range.

14. The light module of claim 13,
wherein the first static filter element is embodied as an interference filter,
wherein the interference filter is embodied as a filter selected from a group of filters consisting of:
a long-pass filter;
a short-pass filter;
a bandpass filter; and
a band-stop filter.

15. The light module of claim 14,
wherein the interference filter is designed at least one of to transmit or to reflect one or a plurality of non-continuous wavelength ranges.

16. The light module of claim 12,
wherein in a plurality of sectors of the color wheel a respective wavelength conversion element is arranged within the first region of the color wheel, and
wherein at least one subregion of the second region is embodied as light-nontransmissive.

17. The light module of claim 12,
wherein at least one subregion of the second region of the color wheel which is embodied as light-transmissive for at least one part of the visible wavelength spectrum is embodied as a through opening in the color wheel.

18. The light module of claim 12,
wherein the at least one subregion of the second region of the color wheel which is embodied as light-transmissive for at least one part of the visible wavelength spectrum has a filter element designed to transmit light in at least one predefinable wavelength range and not to transmit light having wavelengths from a wavelength range that differs from the at least one predefinable wavelength range.

19. The light module of claim 12,
wherein the excitation radiation source comprises at least one of a laser or a laser diode, which emit(s) light in the blue spectral range.

20. The light module of claim 12,
wherein at least one wavelength conversion element is embodied as a red phosphor and/or a yellow phosphor and/or a green phosphor designed to emit light having a dominant wavelength in the red and/or yellow and/or green spectral range, respectively.

* * * * *